(12) United States Patent
Sabet et al.

(10) Patent No.: US 7,196,637 B2
(45) Date of Patent: Mar. 27, 2007

(54) ANTENNA SYSTEM EMBEDDED IN A SUPPORT STRUCTURE FOR INTERROGATING A TIRE SENSOR TRANSPONDER

(75) Inventors: Kazem F. Sabet, Ann Arbor, MI (US); Kamal Sarabandi, Ann Arbor, MI (US); Linda P. Katehi, Zionsville, IN (US); Jiyoun Munn, Ann Arbor, MI (US)

(73) Assignee: EMAG Technologies, Inc., Ann Arbor, MI (US)

( * ) Notice: Subject to any disclaimer, the term of this patent is extended or adjusted under 35 U.S.C. 154(b) by 208 days.

(21) Appl. No.: 10/954,555

(22) Filed: Sep. 30, 2004

(65) Prior Publication Data

US 2005/0110627 A1  May 26, 2005

Related U.S. Application Data

(60) Provisional application No. 60/508,251, filed on Oct. 2, 2003.

(51) Int. Cl.
  *G08G 1/01* (2006.01)
  *B60C 23/00* (2006.01)
(52) U.S. Cl. .............. 340/933; 340/10.1; 340/422; 343/755
(58) Field of Classification Search .................. 340/933
  See application file for complete search history.

(56) References Cited

U.S. PATENT DOCUMENTS

| | | | | |
|---|---|---|---|---|
| 4,067,235 A | * | 1/1978 | Markland et al. | 73/146.5 |
| 5,192,954 A | * | 3/1993 | Brockelsby et al. | 342/42 |
| 5,426,363 A | * | 6/1995 | Akagi et al. | 324/239 |
| 5,448,232 A | * | 9/1995 | Tyburski | 340/933 |
| 5,450,077 A | * | 9/1995 | Tyburski | 340/933 |
| 5,877,705 A | * | 3/1999 | Sampey | 340/933 |
| 6,400,261 B1 | * | 6/2002 | Starkey et al. | 340/442 |
| 6,518,877 B1 | * | 2/2003 | Starkey et al. | 340/447 |
| 6,571,617 B2 | * | 6/2003 | Van Niekerk et al. | 73/146 |
| 6,662,642 B2 | * | 12/2003 | Breed et al. | 73/146 |
| 6,693,557 B2 | * | 2/2004 | Arnold et al. | 340/933 |
| 6,758,089 B2 | * | 7/2004 | Breed et al. | 73/146 |
| 6,900,740 B2 | * | 5/2005 | Bloomquist et al. | 340/905 |
| 2004/0135703 A1 | * | 7/2004 | Arnold et al. | 340/933 |

* cited by examiner

*Primary Examiner*—Daniel Wu
*Assistant Examiner*—George Bugg
(74) *Attorney, Agent, or Firm*—John A. Miller; Warn, Hoffmann, Miller & Ozga, P.C.

(57) ABSTRACT

A vehicle tire interrogation system for interrogating sensors embedded in a vehicle tire. The interrogation system both transmits and receives appropriate RF signals to and from the sensors. The system includes antennas operating at two separate frequency bands that have an input impedance at both frequency bands at 50 ohms, are horizontally polarized, and have a gain at a minimum of 2 dBi at the two frequency bands. The antennas may be printed dual band antennas, such as wideband tapered slot antennas, dual band printed dipoles with reflectors or Yagi-Uda array antennas. The antennas can be embedded in various support structures to protect both the antenna and the vehicle tires.

39 Claims, 8 Drawing Sheets

ANTENNA SYSTEM EMBEDDED IN A SUPPORT STRUCTURE FOR INTERROGATING A TIRE SENSOR TRANSPONDER

CROSS REFERENCE TO RELATED APPLICATIONS

This application claims the benefit of the priority date of U.S. Provisional Patent Application No. 60/508,251, titled Antenna System Embedded in a Support Structure for Interrogating a Tire Sensor Transponder, filed Oct. 2, 2003.

BACKGROUND OF THE INVENTION

1. Field of the Invention

This invention relates generally to a vehicle tire interrogation system for interrogating a tire sensor and, more particularly, to a vehicle tire interrogation system including an antenna that is embedded in a support structure mounted on or within the ground, where the interrogation system interrogates a radio frequency identification (RFID) sensor and/or temperature and pressure sensors embedded in a vehicle tire.

2. Discussion of the Related Art

Heavy trucks and other vehicles are extensively used to transport passengers and goods. These trucks sometimes include eighteen or more tires, creating a large-scale tire tracking challenge. An efficient tire tracking system would speed up inventory and delivery of tires, and also keep statistics on each tire in use, such as pinpointing old or overused tires, before blowouts or other failures occur.

The Michelin Corporation has initiated such a tire tracking system for this purpose. The Michelin tire tracking system embeds RFID sensors and temperature and pressure sensors in some of its tires, which are monitored by an RF interrogation system. The interrogation system includes a remote drive-by unit (DBU) including suitable antennas that interrogate the RFID sensors as the truck, or other vehicle, drives slowly down a particular roadway. Four rows of antennas are strategically placed in the roadway so that all of the inner and outer tires of the truck are interrogated by the system.

The tires include surface acoustic wave (SAW) temperature and pressure sensors and an RFID sensor including a serial number and other information. The interrogation system illuminates the sensors with an RF signal, which causes the sensors to radiate a low frequency, RF signal encoded with a tire ID, temperature, pressure and other information. The temperature and pressure sensors operate at the 434 MHz frequency band and the RFID sensor operates at the 915 MHz frequency band.

The embedded tire sensors are the easiest to interrogate when they are positioned close and parallel to the ground where they are linearly polarized (horizontal orientation). The system positions the rows of antennas in close proximity to the vehicle tires being interrogated to insure that the sensors are interrogated. This leads to a high possibility that the antennas may be run over by the truck tires several times a day. Thus, certain steps need to be taken to protect the integrity of the antennas and the associated DBU components.

SUMMARY OF THE INVENTION

In accordance with the teachings of the present invention, a vehicle tire interrogation system is disclosed for interrogating an RF identification sensor and/or temperature and pressure sensors embedded in a vehicle tire. The interrogation system transmits and receives RF signals to and from the RFID sensor and the temperature and pressure sensors. In one embodiment, the interrogation system includes an antenna that operates in the 433.05–434.79 MHz frequency band and the 902–928 MHz frequency band. Further, the antenna has an input impedance at both frequency bands of 50 ohms, is horizontally polarized, and has a gain of a minimum of 2 dBi at 434 MHz and 6 dBi at 915 MHz. To have these requirements, the antenna includes printed dual band antenna elements. The dual band antennas can be wideband tapered slot antennas, dual band printed dipole antennas with reflectors, or Yagi-Uda array antennas.

The interrogation system can be embedded in various support structures above the ground and in the ground to protect both the antenna and the vehicle tires. In one embodiment, the support structure includes an outer support portion defining a cavity and an inner support portion positioned within the cavity, where the outer support portion is mounted to the roadway. The printed antenna is positioned on posts extending from the inner support portion so that it is surrounded mostly by air within the cavity to increase the antenna gain.

Additional advantages and features of the present invention will become apparent from the following description and appended claims, taken in conjunction with the accompanying drawings.

DETAILED DESCRIPTION OF THE EMBODIMENTS

The following discussion of the embodiments of the invention directed to vehicle tire interrogation systems and associated components for interrogating RF identification sensors and temperature and pressure sensors in a vehicle tire is merely exemplary in nature, and is in no way intended to limit the invention or its applications or uses.

The present invention includes several embodiments of a vehicle tire interrogation system including DBUs positioned on or in the ground, where the DBU includes an antenna that interrogates a radio frequency identification (RFID) sensor and/or temperature and pressure sensors embedded in a vehicle tire. The antenna transmits and receives RF signals to and from the RFID sensor and the temperature and pressure sensors. For one particular vehicle tire interrogation system, the antenna is dual band, operating in the 433.05–434.79 MHz frequency band and the 902–928 MHz frequency band. The antenna also has an input impedance of 50 ohms at both frequency ranges, is horizontally polarized, and has a gain of a minimum of 2 dBi at 434 MHz and 6 dBi at 915 MHz.

Figure 1:
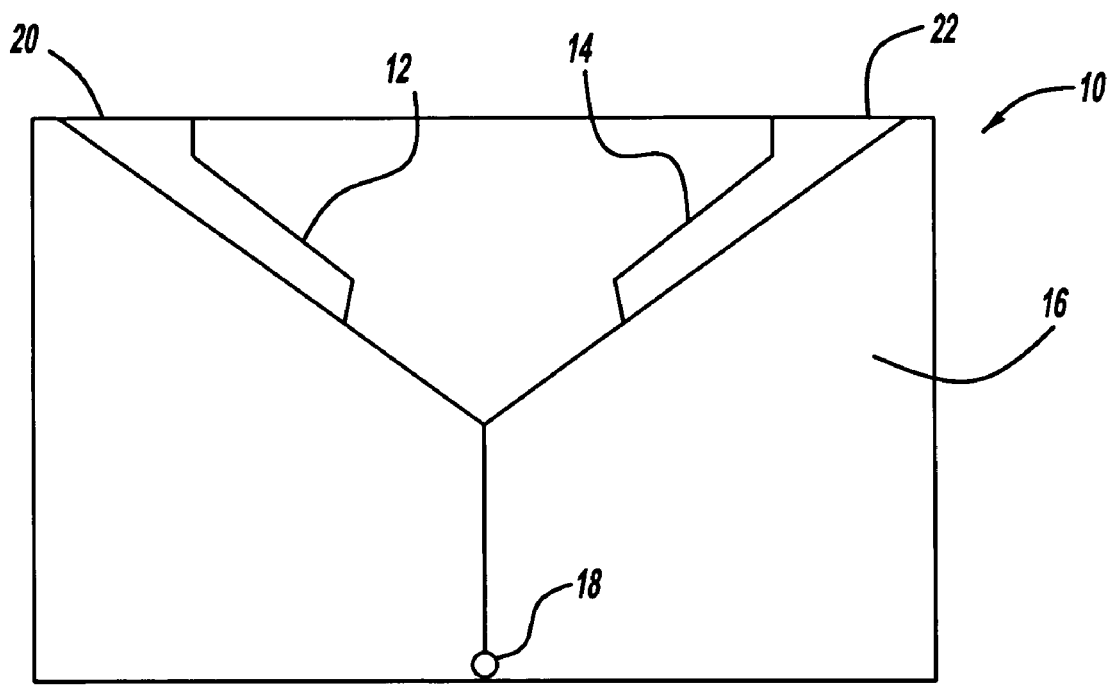
FIG. 1 is a printed circuit layout of a tapered slot antenna for a vehicle tire interrogation system, according to an embodiment of the present invention.

FIG. 1 is a printed circuit layout of a tapered slot antenna (TSA) 10 for a vehicle tire interrogation system that includes the requirements discussed above, according to one embodiment of the present invention. The TSA 10 includes two slot antenna elements 12 and 14 formed in a substrate 16, such as a 20 mil thick, copper plated, microwave laminate, where a coaxial cable (not shown) would be connected to the TSA 10 at port 18. In the transmit mode, an RF signal is introduced at the port 18, is transmitted through the antenna elements 12 and 14 and is output at ports 20 and 22. For the receive mode, the RF signal is received at the ports 20 and 22 and sensed at the port 18. The TSA 10 is linearly polarized and parallel along the edge of the TSA 10 from the port 20 to the port 22. The TSA 10 is a wideband antenna that covers both the 434 MHz frequency band and the 915 MHz frequency band, and is matched to 50 ohms for good power transfer from the antenna to the rest of the interrogation system. The antenna geometry may be modified slightly to compensate for the frequency shift caused when the TSA 10 is embedded in a support structure.

Figure 2:
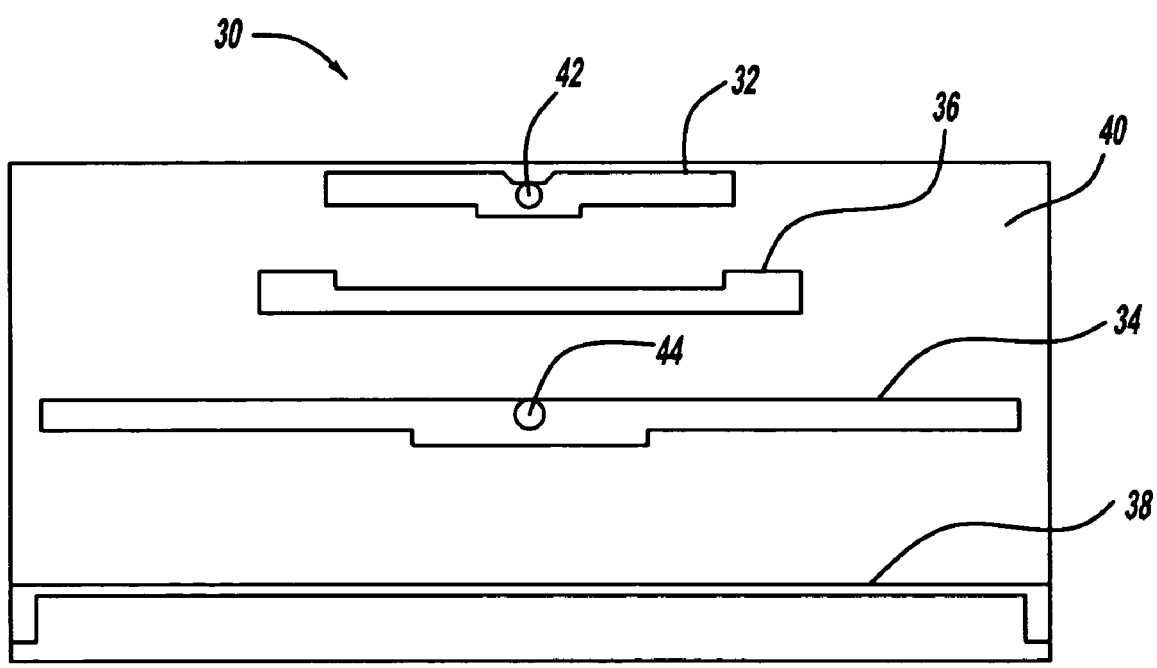
FIG. 2 is a printed circuit layout of dual band dipoles with reflectors for a vehicle tire interrogation system, according to another embodiment of the present invention.

FIG. 2 is a printed circuit layout of a two-port, dual band integrated antenna 30 for a vehicle tire interrogation system, according to another embodiment of the present invention. The antenna 30 includes dual band printed dipole antenna elements 32 and 34 and reflector elements 36 and 38 formed on a substrate 40, where the antenna element 32 and the reflector 36 are tuned to the 915 MHz frequency band and the antenna element 34 and the reflector 38 are tuned to the 434 MHz frequency band. In one embodiment, the antenna elements 32 and 34 and the reflectors 36 and 38 are copper traces deposited on the substrate 40, where the substrate 40 is a high frequency, 20 mil thick copper plated microwave laminate. The reflectors 36 and 38 reduce back scattering and increase the intended directivity by redirecting the RF signal towards the antenna edge. More non-radiating elements, such as reflector elements and director elements, can be added to the antenna 30 to increase antenna directivity.

The antenna includes signal ports 42 and 44, where the port 42 is tuned to the 915 MHz band and the port 44 is tuned to the 434 MHz band. In the transmit mode, the 915 MHz RF signal enters the port 42 from a coaxial cable (not shown) and is transmitted from the antenna element 32. Likewise, in the transmit mode, the 434 MHz RF signal enters the port 44 from a coaxial cable (not shown) and is transmitted from the antenna element 34. In the receive mode, the 915 MHz RF signal resonates the antenna element 32, which is sensed at the port 42. Likewise, the 434 MHz signal resonates the antenna element 34, which is sensed at the port 44. Both of the ports 42 and 44 are matched to 50 ohms for good power transfer from the antenna 30 to the rest of the system. The antenna geometry may be modified slightly to compensate for frequency shifts incurred from being embedded in a support structure.

Figure 3:
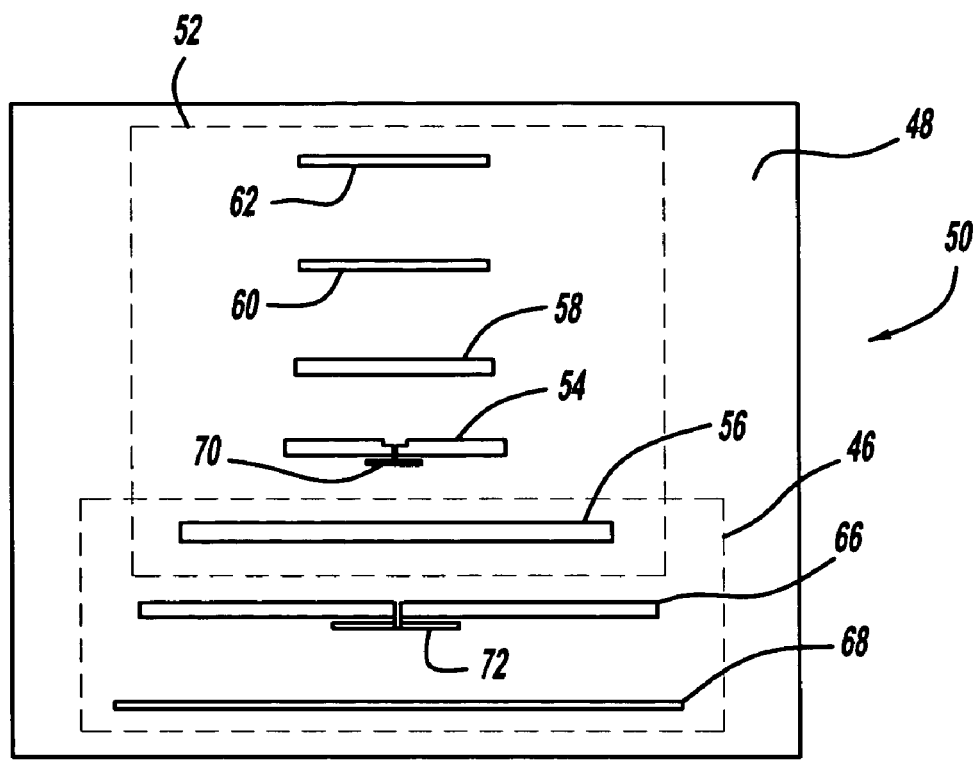
FIG. 3 is a printed circuit layout of a dual band Yagi-Uda array antenna for a vehicle tire interrogation system, according to another embodiment of the present invention.

FIG. 3 is a plan view of a printed circuit layout of a dual band Yagi-Uda array antenna 50 for a vehicle tire interrogation system, according to another embodiment of the present invention. The antenna 50 includes an antenna portion 46 that operates at the 434 MHz frequency band and an antenna portion 52 that operates at the 915 MHz frequency band, and has a maximum theoretical gain of about 9.19 dBi. The 915 MHz frequency band portion 52 includes five antenna elements, particularly one radiator element 54, one reflector element 56 and three director elements 58, 60 and 62 formed on a substrate 48. The 434 MHz frequency band portion 46 includes three antenna elements, particularly one radiator element 66, one reflector element 68 and one director element 56 formed on the substrate 48. The antenna element 56 operates as a reflector element for the antenna portion 52 and a director element for the antenna portion 46 to conserve space. The radiator antenna element 54 is fed at port 70 and the radiator antenna element 66 is fed at port 72 by coaxial cables.

In one embodiment, the spacing of the elements 54, 56, 58, 60, 62, 66 and 68 is about a quarter of a wavelength. At the 434 MHz frequency band, a smaller spacing may be used to save space, but at the price of reduced gain. In this embodiment, the antenna elements 54, 56, 58, 60, 62, 66 and 68 are antenna slots formed in a copper layer on the substrate 48. Alternately, the antenna elements 54, 56, 58, 60, 62, 66 and 68 can be copper traces on a dielectric substrate.

Figure 4:
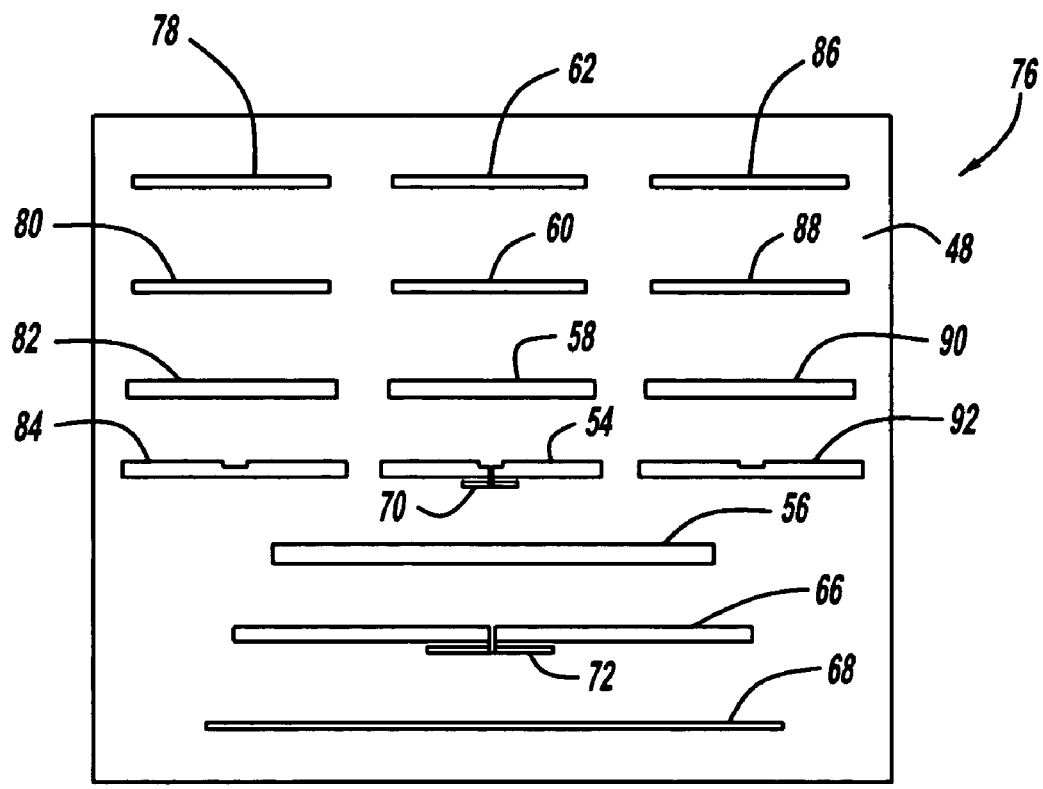
FIG. 4 is a printed circuit layout of a dual band Yagi-Uda array antenna similar to the array antenna shown in FIG. 3, and including additional director elements, for a vehicle tire interrogator system, according to another embodiment of the present invention.

FIG. 4 is a printed circuit layout of a dual band Yagi-Uda array antenna 76 that is similar to the array antenna 50, where like elements are identified by the same reference numeral. In this design, four additional director elements 78, 80, 82 and 84 are provided on one side of the elements 54, 58, 60 and 62 and four additional director elements 86, 88, 90 and 92 are provided on the other side of the elements 54, 58, 60 and 62 to increase the gain of the antenna portion 52. The additional director elements 78–92 are placed in rows a half-wavelength away and parallel with the antenna portion 52 in the antenna 50. The modified arrays provide 3 dBi more gain at the 915 MHz frequency band.

The various antenna elements discussed above can be fabricated on low-cost flexible substrates. The elements can be printed on thin films using flexographic or lithographic techniques with conductive inks, such as silver, carbon or seed.

The antennas 10, 30, 50 and 76 discussed above typically need to be embedded in a support structure on or within the ground for proper operation of the interrogation system. The support structure should be designed to protect both the antennas and the vehicle tires, and provide the following system requirements.
1) The support structure should be designed for the lowest possible attenuation of the RF signal.
2) The support structure should protect the antenna from the weight of the vehicles driving over it multiple times per day.
3) The support structure should be flexible enough so as to not harm the vehicle tires if they run over it.
4) The support structure should encapsulate the antenna and protect it from environmental conditions and mechanical vibrations.
5) The support structure should keep the antenna fixed in place so that its horizontal polarization is always parallel to the ground. In order to receive optimum reception, the antenna surface has to be either parallel to the ground or at an appropriate angle directed towards the embedded antennas while maintaining horizontal polarization.

The various embodiments of the support structures discussed below for a vehicle tire interrogation system can employ any of the antennas 10, 30, 50 and 76 discussed above, or any other suitable antenna, for a particular application.

It has been discovered that the antenna for the interrogation system should be kept as far off the ground and in line of sight of the RF sensors in the tires as possible. By using a horizontally polarized antenna, ground effect worsened the antenna gain as the antenna got closer to the ground. Several of the antennas will be activated simultaneously in close proximity to each other. The antennas are designed for installation on the ground, specifically on a concrete pad. These constraints along with the surrounding vehicle environment complicate the problem of interference between the antennas. The antennas are installed in rows along which a vehicle will travel through. Rows on either side of the roadway will interrogate a vehicle's outer tires. For vehicles with dual tires, two more rows of antennas will be lined back-to-back to face the inner tires. In all cases, it is desired that isolation be maximized between antennas facing each other, back-to-back to each other and side-to-side of each other.

Figure 5:
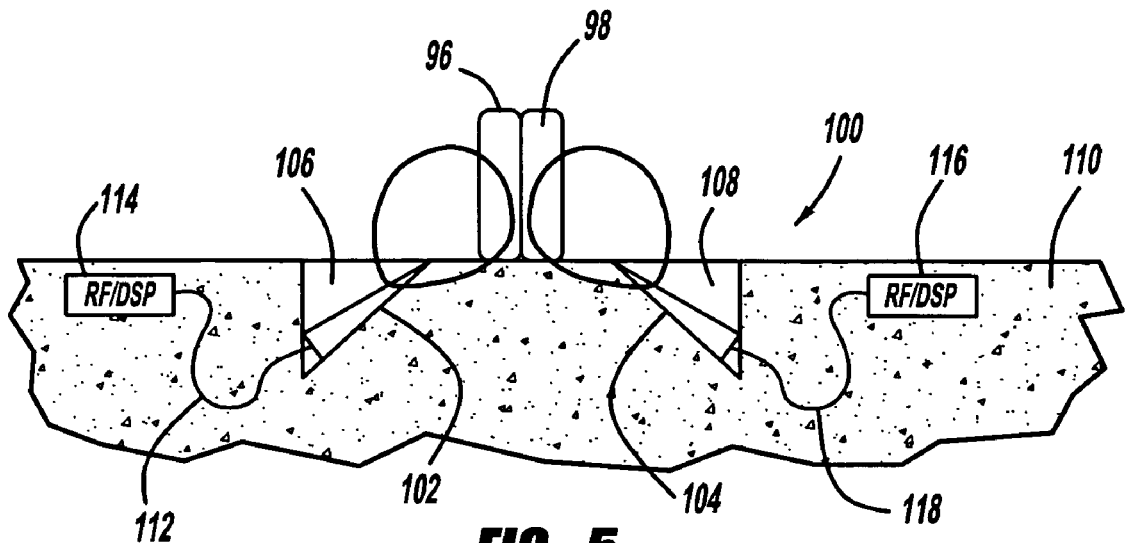
FIG. 5 is a plan view of a vehicle tire interrogation system including antennas positioned in holes in the ground, according to an embodiment of the present invention.

FIG. 5 is a plan view of a vehicle tire interrogation system 100 for interrogating RFID sensors and/or temperature and pressure sensors in two adjacent tires 96 and 98 of a vehicle, such as an eighteen-wheel truck, according to another embodiment of the present invention. The system 100 includes a first printed dipole antenna 102 positioned within an angled opening 106 formed in the ground, such as a concrete roadway 110, relative to the tire 96. Additionally, the system 100 includes a second printed dipole antenna 104 positioned within an angled opening 108 in the roadway 110 relative to the tire 98. The antenna 102 is electrically coupled to an RF digital signal processor (DSP) 114 by a coaxial cable 112 and the antenna 104 is electrically coupled to an RF/DSP 116 by a coaxial cable 118. The DSPs 114 and 116 can be positioned at any suitable location, such as at a remote monitoring location, relative to the roadway 110. As the vehicle travels down the roadway 110, the antenna 102 interrogates the sensors in the tire 96 and the antenna 104 interrogates the sensors in the tire 98, which signals are processed by the DSPs 114 and 116, respectively. The system 100 would probably include two other antennas for simultaneously interrogating sensors in the other tires of the vehicle on the same axle as the tires 96 and 98.

The antennas 102 and 104 are oriented at an optimum angle relative to the vehicle tires 96 and 98, respectively, in order to interrogate the tire's embedded sensors. The roadway 110 decreases the signal interference between the antennas 102 and 104 because the back power of the antennas 102 and 104 is lost in the earth. A nonconductive cover (not shown) can be placed over the openings 106 and 108 to further protect the antennas 102 and 104 from environmental conditions, dust and vibrations. The antennas 102 and 104 are not in direct contact with the tires 96 and 98. Further, the surface of the roadway 110 is smooth so that the tires 96 and 98 will be unaffected by a rough roadway.

Figure 6:
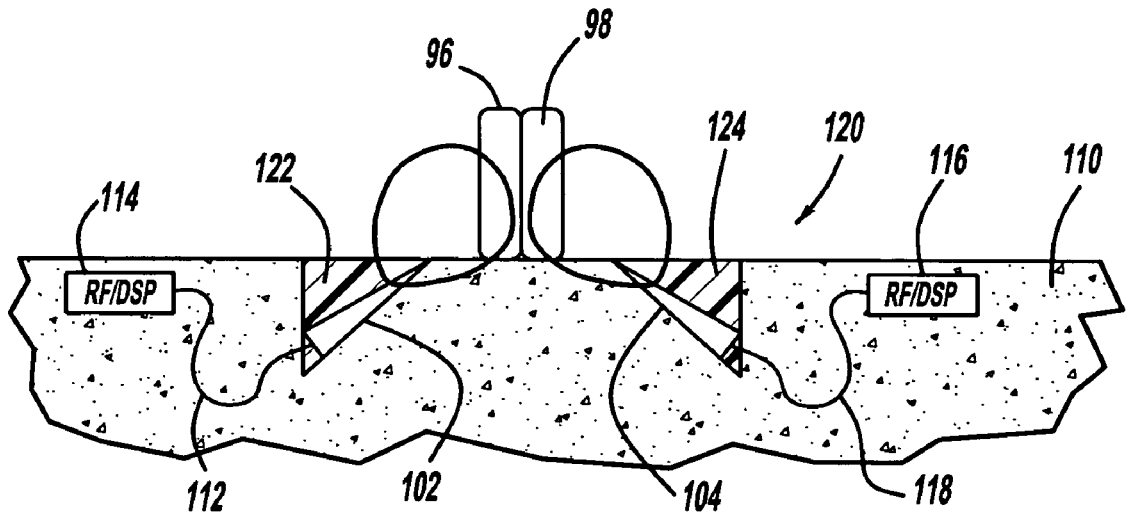
FIG. 6 is a plan view of a vehicle tire interrogation system including antennas positioned in a solid structure within the ground, according to another embodiment of the present invention.

FIG. 6 is a plan view of a vehicle tire interrogation system 120 that is similar to the system 100, where like elements are identified with the same reference numeral, according to another embodiment of the present invention. In this design, the dipole antennas 102 and 104 are encapsulated within bodies 122 and 124, respectively, formed in the roadway 110. The antennas 102 and 104 are thus better protected from hostile environmental conditions and mechanical vibrations. The encapsulated material of the bodies 122 and 124 can be concrete or other nonconductive composites, such as polyurethane, fiberglass, epoxy, etc., and can be molded around the antennas 102 and 104, which will be firmly oriented towards the tire's embedded sensors.

Figure 7:
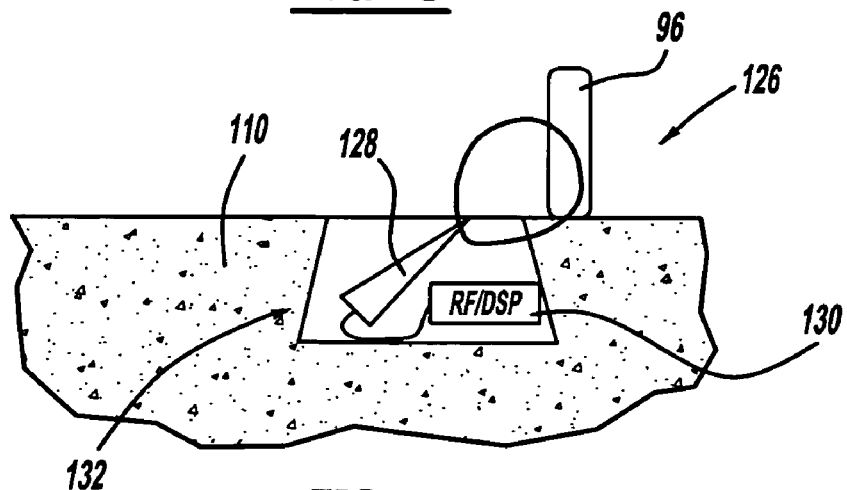
FIG. 7 is a plan view of a vehicle tire interrogation system including an antenna positioned within a reinforced hole and a polymer-concrete box, according to another embodiment of the present invention.

FIG. 7 is a plan view of a vehicle tire interrogation system 126, according to another embodiment of the present invention, where a dipole antenna 128 and an RF/DSP unit 130 are mounted in a reinforced polymer-concrete box 132. A hole is dug into the roadway 110 and the sides are reinforced with an appropriate material. The polymer-concrete box 132 is then placed within the hole. A commercially available polycrete box is manufactured by Highline Products that is suitable for this purpose. This reinforced, sealed environment will protect the antenna 128 and the control electronics.

Figure 8:
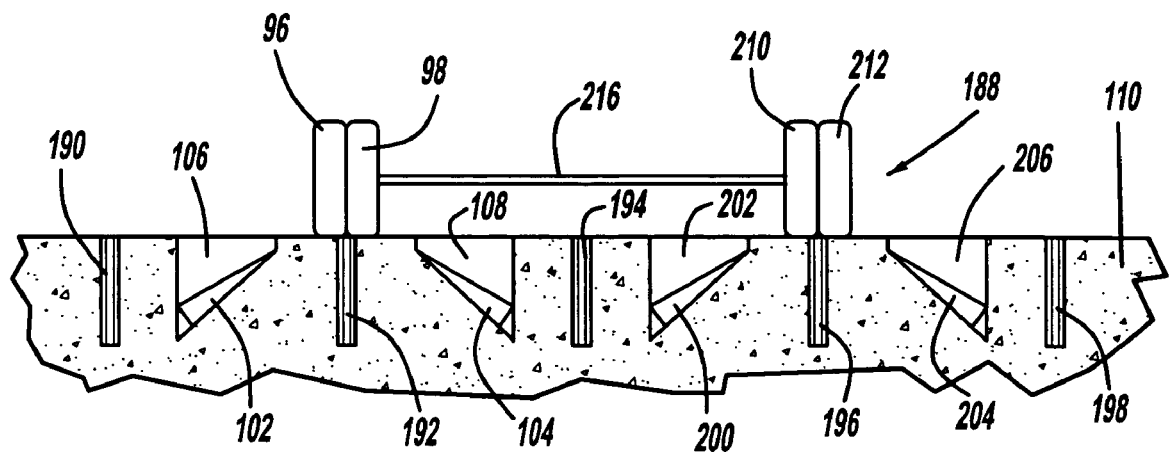
FIG. 8 is a plan view of a vehicle tire interrogation system including metal strips positioned between the antennas to improve the front-to-back ratio and gain of the system, according to another embodiment of the present invention.

FIG. 8 is a plan view of a vehicle tire interrogation system 188 similar to the interrogation systems discussed above, where like elements are identified by the same reference numeral, according to another embodiment of the present invention. The system 188 includes a second pair of antennas 200 and 204 positioned in openings 202 and 206, respectively, in the roadway 110 for interrogating other tires 210 and 212 of the vehicle mounted to the same axle 216 as the tires 96 and 98, as shown. In the system 188, metal members 190-198 or wire mesh are strategically installed within the roadway 110 between and adjacent to the antennas 102, 104, 200 and 204 as shown to improve the antennas 102, 104, 200 and 204 front-to-back ratio and directivity.

Figure 9:
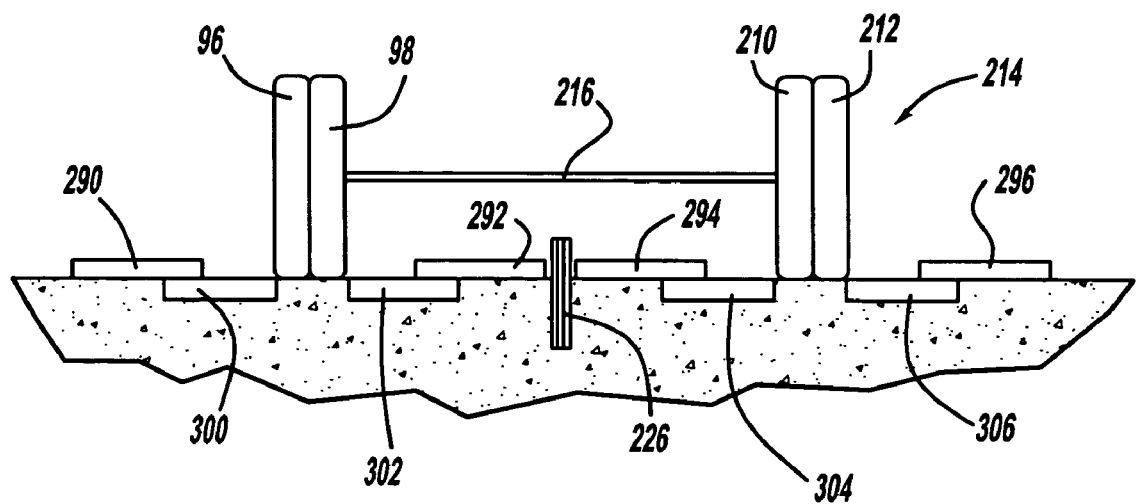
FIG. 9 is a plan view of a vehicle tire interrogation system including grooves or metal inserts in the ground positioned between the antenna to improve the front-to-back ratio and gain of the system, according to another embodiment of the invention.

FIG. 9 is a plan view of a vehicle tire interrogation system 214, according to another embodiment of the present invention, that interrogates sensors in the tires 96, 98, 210 and 212 of the vehicle. In this embodiment, dipole antennas 290, 292, 294 and 296 are strategically positioned on the roadway 110 relative to the tires 96, 98, 210 and 212 instead of within the roadway 110 to interrogate the tires 96, 98, 210 and 212.

Grooves or metal inserts 300, 302, 304 and 306 are embedded in the roadway 110 adjacent to and between the antennas 290, 292, 294 and 296 and the appropriate tire 96, 98, 210 and 212, as shown, to act as a director and improve the antenna gain. Additionally, a metal member 226 is positioned between the antennas 292 and 294.

Figure 10:
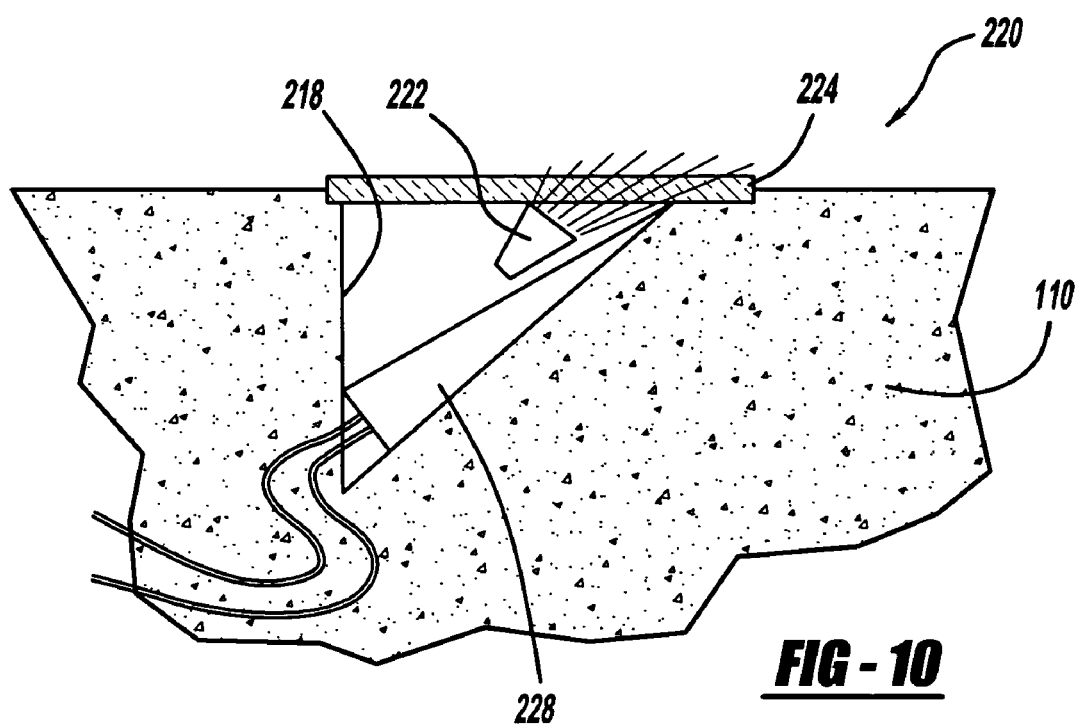
FIG. 10 is a plan view of a vehicle tire interrogation system including an antenna positioned within a hole in the ground, where the system employs a light guide and a heat lamp, according to another embodiment of the present invention.

In order to improve the effectiveness of the antennas, appropriate signs can be used to guide the vehicles during the interrogation process. Reflectors and/or bright colored signs can be used for this purpose. FIG. 10 is a plan view of a vehicle tire interrogation system 220 including an antenna 228 mounted within an opening 218 in the roadway 110. The system 220 includes a light 222 positioned within the opening 218 adjacent to the antenna 228 to illuminate the location where the vehicle operator needs to drive the vehicle. Additionally, a cover 224 can cover the opening, and can be a protective slab of plastic that will act as a radome. Additionally, the light 222 can be a heat lamp that is used to melt ice or snow during the cold season to ensure good performance of the antenna.

Figure 11A:
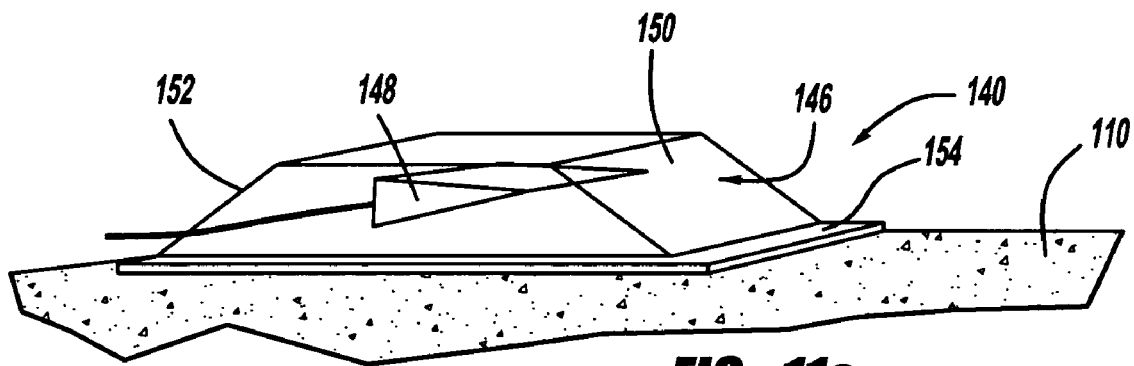
FIGS. 11(a)–11(c) are perspective views of speed-bump type drive-by units for a vehicle tire interrogation system, according to another embodiment of the present invention.
Figure 11B:
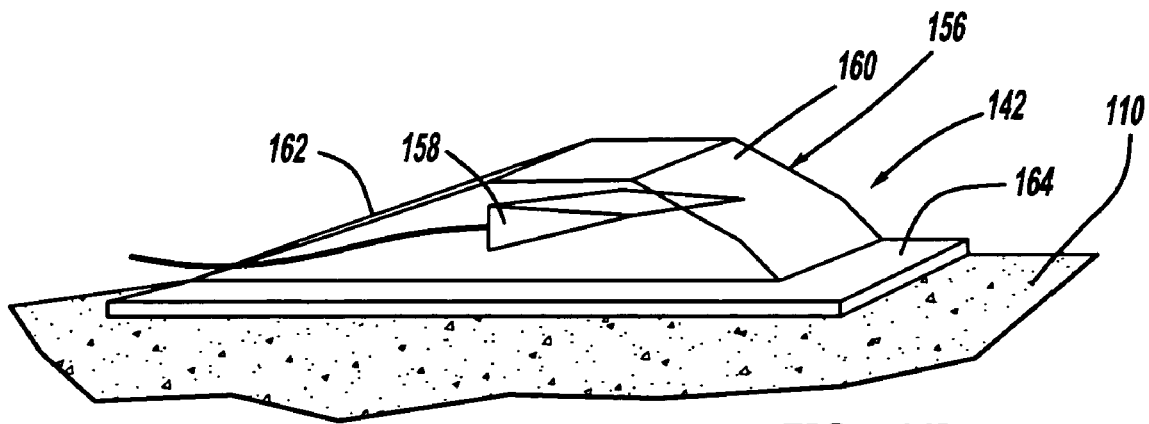
Figure 11C:
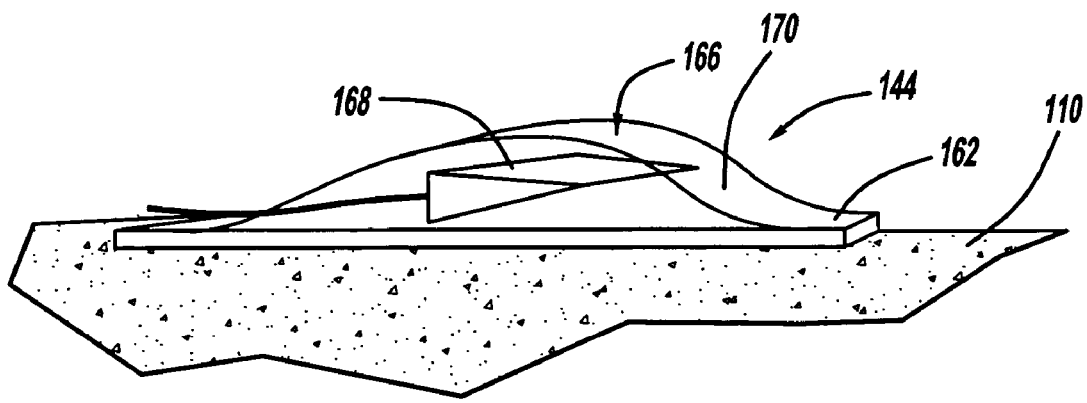

The interrogation system 214 includes the antennas 290, 292, 294 and 296 as part of DBUs positioned on the roadway 110. This provides a more mobile and less expensive system than providing the antennas in the roadway 110 because they are easier to maintain and replace. However, above ground DBUs need to be designed to withstand impact with the vehicle tires 96, 98, 210 and 212. FIGS. 11(a)–11(c) show three speed-bump type DBUs 140, 142 and 144, respectively, that are mounted on the roadway 110 that satisfy this requirement.

The DBU 140 includes a support structure 146 having a dipole antenna 148 embedded therein. The support structure 146 includes angled ends 150 and 152 that provide less resistance from the force of a vehicle tire riding over the DBU 140. Additionally, the support structure 146 includes a flange 154 that provides a surface to mount the support structure 146 to the roadway 110. The DBU 142 includes a support structure 156 encapsulating a dipole antenna 158. The support structure 156 includes angled ends 160 and 162, and a mounting flange 164. The DBU 144 includes a support structure 166 encapsulating a dipole antenna 168. The support structure 166 includes an angled surface 170 and a mounting flange 172. The antennas 148, 158 and 168 and their coaxial cables are protected from water and the weight of the vehicle tires by the support structures 146, 156 and 166, respectively. The structure can be attached to the roadway 110 by any appropriate technique, such as asphalt screws or glue.

The support structures 146, 156 and 166 are either solid or hollow and made of a nonconductive composite material, such as polyurethane, fiberglass or epoxy. There is a design trade-off related to the selection of the encapsulated material. The support structure has to be rugged enough to protect the antenna from the environment, vibrations and truck weight. On the other hand, the support structure has to be made flexible to avoid cracking. A layer of rubber or other vibration absorbing material can be installed beneath the support structure in order to provide a better accommodation for the truck.

Figure 12:
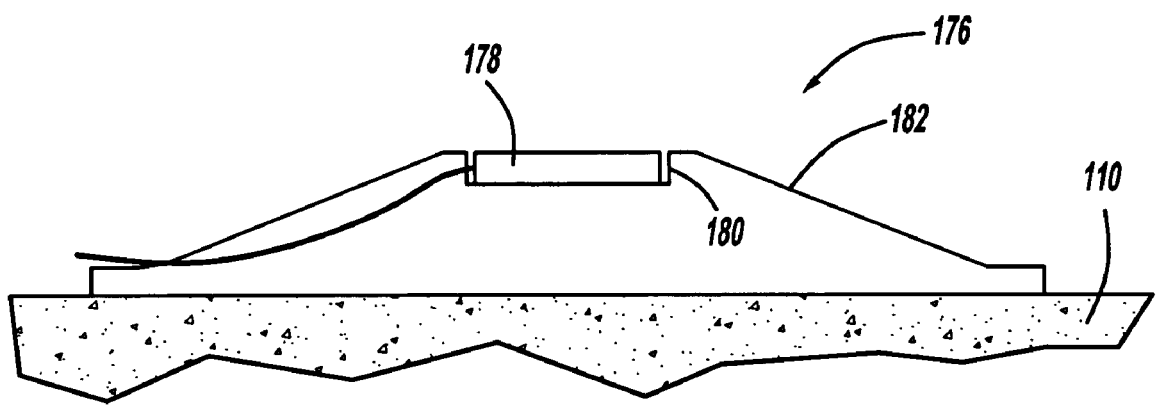
FIG. 12 is a side view of a speed-bump type drive-by unit for a vehicle tire interrogation system, according to another embodiment of the present invention.

FIG. 12 is a side view of a speed-bump type DBU 176 mounted on the roadway 110. The DBU 176 includes a dipole antenna 178 mounted in a recess 180 of a support structure 182. The support structure 182 operates as both an antenna positioner and a protective structure for holding the antenna 178 in place. New antennas can be easily replaced if necessary during maintenance.

Figure 13:
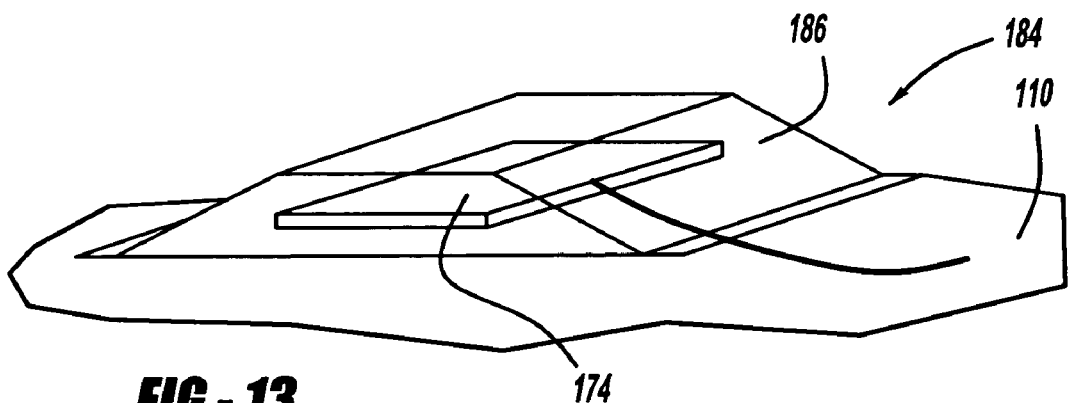
FIG. 13 is a perspective view of a speed-bump type drive-by unit for a vehicle tire interrogation system, according to another embodiment of the present invention.

FIG. 13 shows a DBU 184 mounted to the roadway 110 where an antenna element 174 is embedded within a speed-bump type support structure 186, according to another embodiment of the present invention.

Additional variations may be added to the embedded antenna structure of the invention. Each antenna in the DBU should read only one tire at a time. Back-to-back antennas located in two middle rows of the vehicle roadway 110 should have an adequately high front-to-back ratio to avoid interrogating the tires in the adjacent row.

The antennas for the interrogation systems discussed above are end-fire antennas. To further increase the antennas front-to-back ratio, a vertical back plane can be installed about a half of an inch behind the antenna board. When the back-to-back antennas are activated beneath a metallic structure, such as a truck bed, the antenna field tended to bounce backwards, lowering the isolation between antennas. This effect is especially bad directly beneath a truck axle. As a solution, a horizontal plate can be installed above the top of the housing structure. The plate can be centered between the back-to-back antennas, and is as wide as possible without overlapping the antennas metallic traces. This horizontal plate increases the isolation between back-to-back antennas beneath a truck trailer or other metallic structures.

Figure 14:
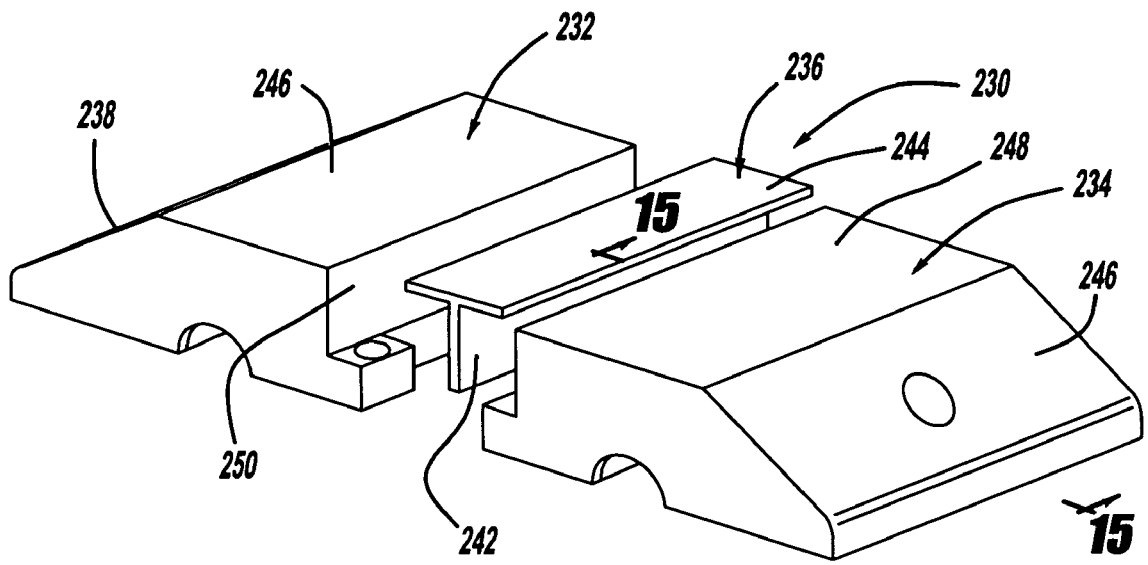
FIG. 14 is a perspective view of a drive-by unit for a vehicle tire interrogation system, where the unit employs two back-to-back Yagi-Uda array antenna blocks positioned within a honeycomb support structure, according to another embodiment of the present invention.

FIG. 14 is a perspective view of a DBU assembly 230 for a vehicle tire interrogation system, according to another embodiment of the present invention. The DBU assembly 230 includes a first DBU 232 for interrogating one tire of the vehicle and a second DBU 234 for interrogating an opposing tire of the vehicle. A T-shaped metal reflector 236 including a horizontal portion 244 and a vertical portion 242 is positioned between the DBUs 232 and 234. The reflector 236 prevents the signals transmitted from and received by the antennas in the DBUs 232 and 234 from interfering with each other. The DBU 232 includes an angled side surface 238 and a top horizontal surface 246. Likewise, the DBU 234 includes an angled side surface 246 and a top horizontal surface 248. The DBUs 232 and 234 are shown slightly separated in FIG. 14. When the DBUs 232 and 234 are mounted to the roadway 110, they will be positioned close together so that the horizontal portion 244 of the reflector 236 rests on the top surfaces 246 and 248 and an inside surface 250 of the DBU 232 and an inside surface 240 of the DBU 234 are in contact with the vertical portion 242 of the reflector 236. The angled surfaces 238 and 246 reduce the impact force of the vehicle tires contacting the DBUs 232 and 234 if they accidentally run over the assembly 230.

Figure 15:
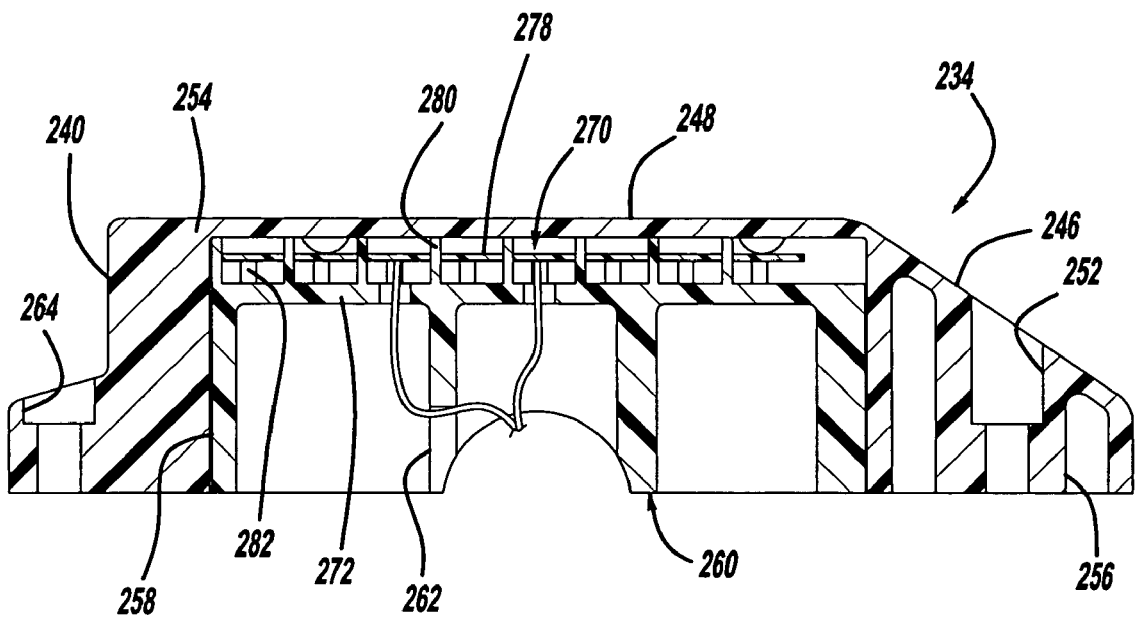
FIG. 15 is a cross-sectional view of the drive-by unit shown in FIG. 14 through line 15—15.

FIG. 15 is a cross-sectional view of the DBU 234 through line 15—15, where the DBU 232 is identical. The DBU 234 includes an outer support portion 254 made of a suitable durable plastic. The outer support portion 254 defines an internal cavity 258 therein. An internal support portion 260 is positioned within the cavity 258, and supports a printed circuit board antenna 270, as will be discussed in more detail below. The outer support portion 254 is a single piece plastic molded structure and includes removed portions 256 to make the DBU 234 lighter. Further, the outer support portion 254 includes bores 264 and 252 that allow the DBU 234 to be bolted to the roadway 110.

Figure 16:
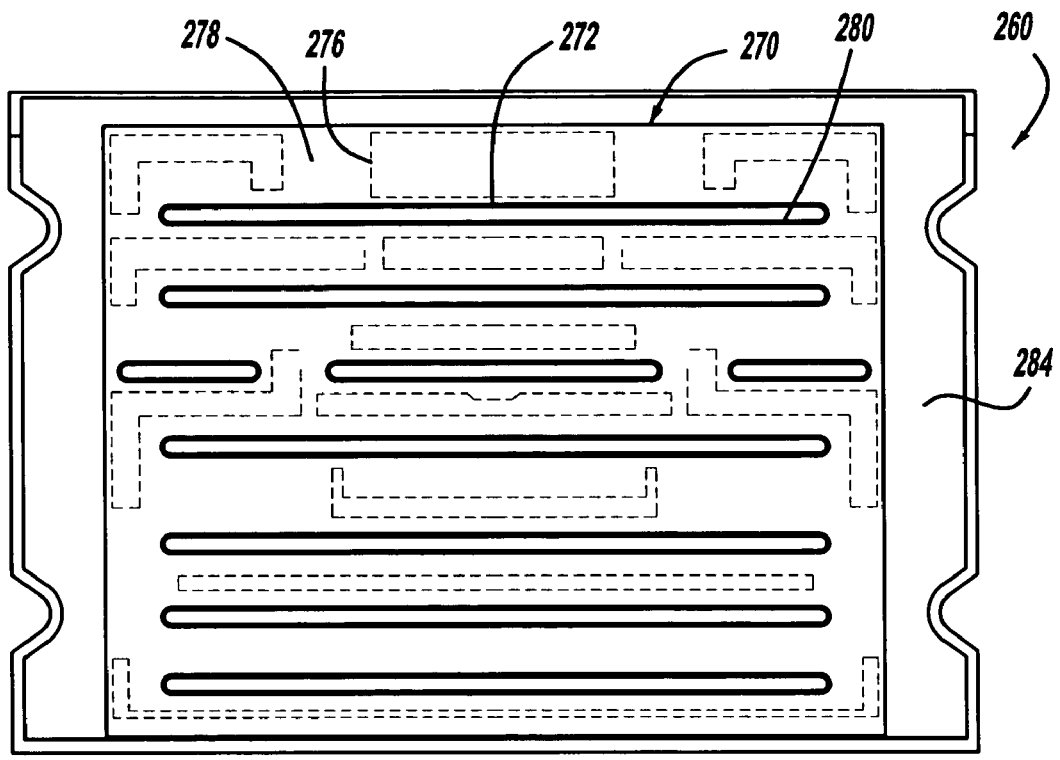
FIG. 16 is a top view of an internal support portion of the drive-by unit shown in FIG. 14.

FIG. 16 is a top view of the inner support portion 260 separated from the DBU 234. The inner support portion 260 supports the printed antenna 270. The printed antenna 270 can be any of the antennas discussed above that operates in the 915 MHz frequency band and the 434 MHz frequency band. The antenna 270 includes several strategically formed antenna elements, director elements and reflector elements 276 deposited on an undersurface of a substrate 278 that are tuned to these frequency bands. The antenna elements 276 can be slots formed in a metal substrate, metallized elements formed on the substrate 278 or conductive ink deposited on a flexible substrate.

Figure 17:
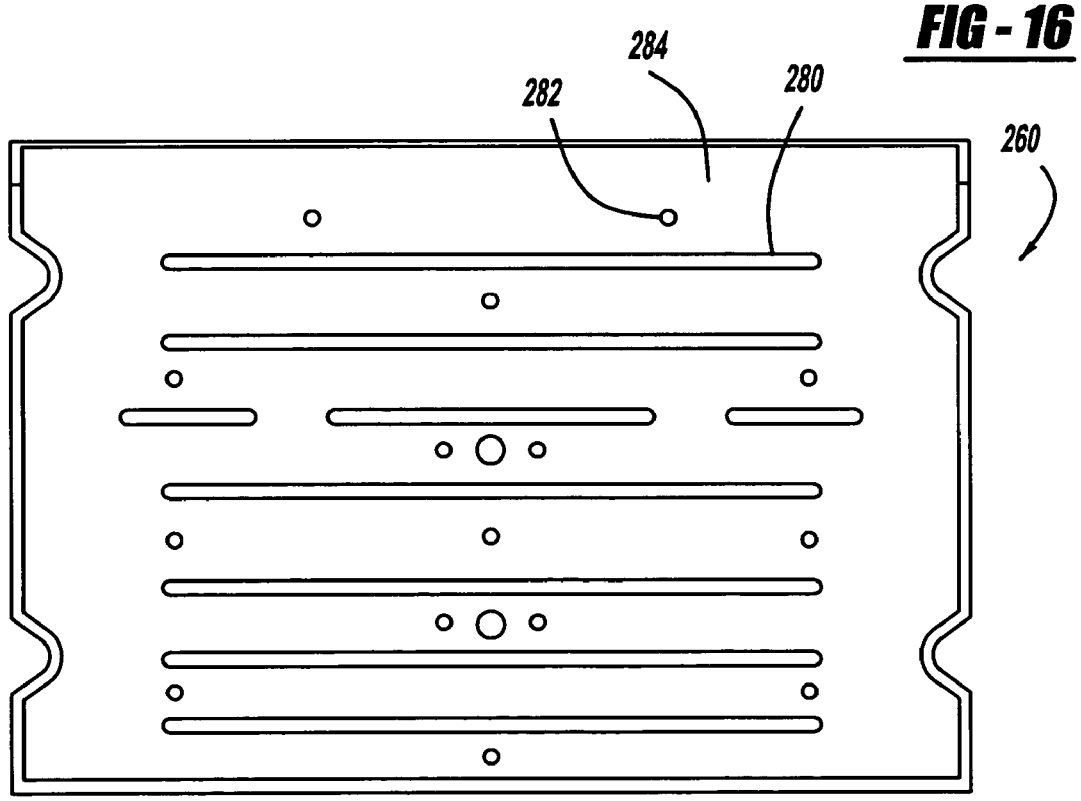
FIG. 17 is a top view of the internal support portion shown in FIG. 14 with the printed antenna removed.

FIG. 17 is a top view of the inner support portion 260 with the antenna 270 removed. The inner support portion 260 is a single piece plastic molded member having a structural configuration 262 that includes walls and open spaces therebetween and a top surface 284. A series of ridges 280 and support posts 282 extend up from the top surface 284. The ridges 280 extend through slots 272 in the substrate 278 to position and align the antenna 270 at the proper location. The substrate 278 rests on the posts 282 so that the antenna 270 is "floating" within the cavity 258 between the inner support portion 260 and the outer support portion 254 to provide an air gap that provides increased antenna gain.

In one embodiment, there is about one-half of an inch air gap on both sides of the antenna 270. The support posts 282 are placed at non-critical locations relative to the elements 276, particularly, away from the main radiating elements and between the reflector and director elements. The structural configuration 262 of the support portions 244 and 260 also increase the air around the antenna 270 to provide increased antenna gain.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A vehicle tire interrogation system comprising:
   at least one antenna including antenna elements formed on a substrate, said antenna being operable to transmit and receive RF signals for interrogating a sensor within a vehicle tire; and
   a support structure encapsulating the antenna, said support structure being operable to be mounted on top of a roadway and being sufficiently durable to withstand collisions from a vehicle tire on a vehicle without adversely affecting the performance of the antenna;
   said support structure including an outer support portion defining a cavity and an inner support portion positioned within the cavity, and wherein the at least one antenna is positioned in the cavity between the outer support portion and the inner support portion so that the at least one antenna is substantially surrounded by air.

2. The system according to claim 1 wherein the support structure includes at least one angled side portion.

3. The system according to claim 1 wherein the support structure includes a structural configuration that includes walls and open spaces therebetween.

4. The system according to claim 1 wherein the support structure includes an encapsulating material selected from the group consisting of nonconductive composites, concrete, polyurethane, fiberglass and epoxy.

5. The system according to claim 1 wherein the inner support portion includes a plurality of ridges and a plurality of support posts, wherein the plurality of ridges extend through openings in the substrate of the antenna and the plurality of posts support the antenna.

6. The system according to claim 5 wherein the ridges and the posts define an air gap around the antenna of at least one-half of an inch on both sides of the substrate.

7. The system according to claim 1 wherein the inner support portion is a single piece molded plastic member and the outer support portion is a single piece molded plastic member.

8. The system according to claim 1 further comprising at least one metal member for improving a front-to-back ratio of the at least one antenna.

9. The system according to claim 1 further comprising a light positioned proximate to the at least one antenna.

10. The system according to claim 1 wherein the at least one antenna is a plurality of antennas positioned in a row for interrogating sensors in a plurality of tires.

11. The system according to claim 10 further comprising a plurality of metal members positioned between the plurality of antennas.

12. The system according to claim 1 wherein the at least one antenna is selected from the group consisting of a tapered slot antenna, a dual band printed dipole antenna with reflectors and a Yagi-Uda array antenna.

13. The system according to claim 1 wherein the antenna elements include a plurality of director elements and reflector elements.

14. The system according to claim 1 wherein the substrate is a flexible substrate and the antenna elements are conductive ink deposited on the substrate.

15. The system according to claim 1 wherein the at least one antenna operates at both a 915 MHz frequency band and a 434 MHz frequency band.

16. The system according to claim 15 wherein the at least one antenna has an input impedance of 50 ohms at both the 434 MHz and 915 MHz frequency bands, is horizontally polarized, and has a gain of a minimum of 2 dBi at the 434 MHz frequency band and 6 dBi at the 915 MHz frequency band.

17. The system according to claim 1 wherein the at least one antenna is horizontally polarized.

18. A vehicle tire interrogation system for interrogating sensors in vehicle tires, said system comprising a plurality of drive-by units mounted on top of a roadway in a predetermined configuration, each drive-by unit including a printed antenna having antenna elements formed on a substrate, said antenna elements operating in both a 915 MHz frequency band and a 434 MHz frequency band, said antenna being operable to transmit and receive RF signals for interrogating the sensors, each drive-by unit further including a support structure encapsulating the printed antenna that is sufficiently durable to withstand collisions from a vehicle tire on a vehicle without adversely affecting the performance of the antenna;
   said support structure including an outer support portion defining a cavity and an inner support portion positioned within the cavity, and wherein the antenna is positioned in the cavity between the outer support portion and the inner support portion so that the antenna is substantially surrounded by air.

19. The system according to claim 18 wherein the inner support portion includes a plurality of ridges and a plurality of posts, wherein the plurality of ridges extend through openings in the substrate of the antenna and the plurality of posts support the antenna.

20. The system according to claim 19 wherein the ridges and the posts define an air gap around the antenna of at least one-half of an inch on both sides of the substrate.

21. The system according to claim 18 wherein the inner support portion is a single piece molded plastic member and the outer support portion is a single piece molded plastic member.

22. The system according to claim 18 further comprising a plurality of metal members positioned between the drive-by units for protecting the antennas from RF interference.

23. The system according to claim 18 wherein the antennas are selected from the group consisting of tapered slot antennas, dual band printed dipole antennas with reflectors and Yagi-Uda array antennas.

24. The system according to claim 18 wherein the antenna elements include a plurality of director elements and reflector elements.

25. The system according to claim 18 wherein the substrate is a flexible substrate and the antenna elements are conductive ink deposited on the substrate.

26. The system according to claim 18 wherein the at least one antenna has an input impedance of 50 ohms at both the 434 MHz and 915 MHz frequency bands, is horizontally polarized, and has a gain of a minimum of 2 dBi at the 434 MHz frequency band and 6 dBi at the 915 MHz frequency band.

27. A drive-by unit for a vehicle tire interrogation system, said unit comprising:
 a support structure including an outer support portion defining a cavity and an inner support portion positioned within the cavity, said inner support portion including a plurality of ridges and a plurality of posts; and
 an antenna positioned in the cavity between the outer support portion and the inner support portion, said antenna including a plurality of antenna elements, a substrate and a plurality of slots formed through the substrate, wherein the plurality of ridges extend through slots in the substrate and the plurality of posts support the antenna.

28. The unit according to claim 27 wherein the ridges and the posts define an air gap around the antenna of at least one-half of an inch on both sides of the substrate.

29. The unit according to claim 27 wherein the inner support portion is a single piece molded plastic member and the outer support portion is a single piece molded plastic member.

30. The unit according to claim 27 wherein the antenna is selected from the group consisting of a tapered slot antenna, a dual band printed dipole antenna with reflectors and a Yagi-Uda array antenna.

31. The unit according to claim 27 wherein the antenna elements include a plurality of director elements and reflector elements.

32. The unit according to claim 27 wherein the substrate is a flexible substrate and the antenna elements are conductive ink deposited on the substrate.

33. The unit according to claim 27 wherein the antenna operates at both a 915 MHz frequency band and a 434 MHz frequency band.

34. The unit according to claim 33 wherein the at least one antenna has an input impedance of 50 ohms at both the 434 MHz and 915 MHz frequency bands, is horizontally polarized, and has a gain of a minimum of 2 dBi at the 434 MHz frequency band and 6 dBi at the 915 MHz frequency band.

35. A vehicle tire interrogation system comprising:
 at least one antenna including antenna elements formed on a substrate, said antenna being operable to transmit and receive RF signals for interrogating a sensor within a vehicle tire;
 a support structure encapsulating the antenna, said support structure being operable to be mounted to or within a roadway; and
 at least one metal member for improving a front-to-back ratio of the at least one antenna.

36. A vehicle tire interrogation system comprising:
 at least one antenna including antenna elements formed on a substrate, said antenna being operable to transmit and receive RF signals for interrogating a sensor within a vehicle tire;
 a support structure encapsulating the antenna, said support structure being operable to be mounted to or within a roadway; and
 a light positioned proximate to the at least one antenna for determining the position of the antenna.

37. A vehicle tire interrogation system comprising:
 a plurality of antenna elements, each antenna element formed on a substrate, said plurality of antenna elements being positioned in a row, said antennas being operable to transmit and receive RF signals for interrogating a sensor within a vehicle tire;
 a plurality of support structures, each support structure encapsulating an antenna, said support structure being operable to be mounted on or within a roadway; and
 a plurality of metal members positioned between the plurality of antennas.

38. A vehicle tire interrogation system comprising:
 at least one antenna including antenna elements formed on a substrate, said antenna being operable to transmit and receive RF signals for interrogating a sensor within a vehicle tire, wherein the antenna elements include a plurality of director elements and reflector elements; and
 a support structure encapsulating the antenna, said support structure being operable to be mounted to or within a roadway.

39. The system according to claim 1 wherein the at least one antenna operates in a frequency band for a sensor that transmits RF signals having temperature and pressure information and a frequency band that transmits RF signals for identification purposes.

* * * * *